May 27, 1924.

V. J. VERHEYEN

SCREW CUTTING MACHINE

Filed Nov. 15, 1921

Inventor:
Victor J. Verheyen
By
Rectionage & Bost
attys

May 27, 1924.

V. J. VERHEYEN

SCREW CUTTING MACHINE

Filed Nov. 15, 1921

May 27, 1924.
V. J. VERHEYEN
SCREW CUTTING MACHINE
Filed Nov. 15, 1921
1,495,622
3 Sheets-Sheet 3
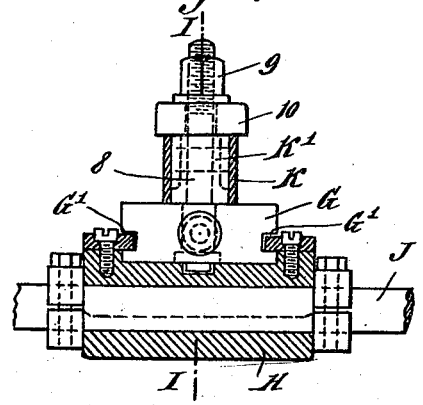
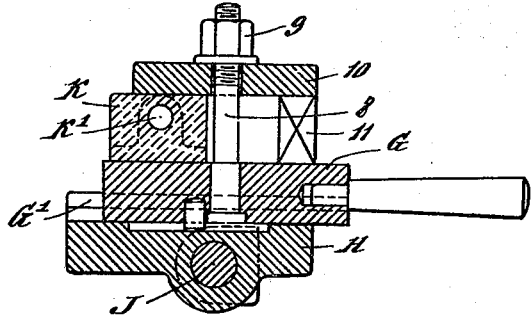
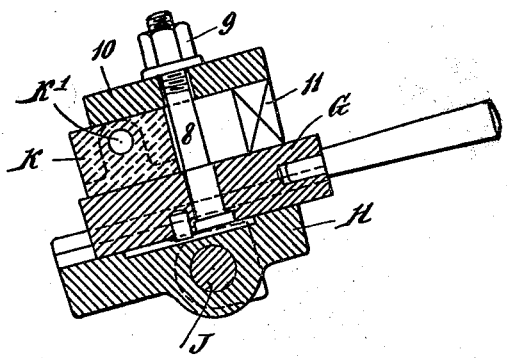
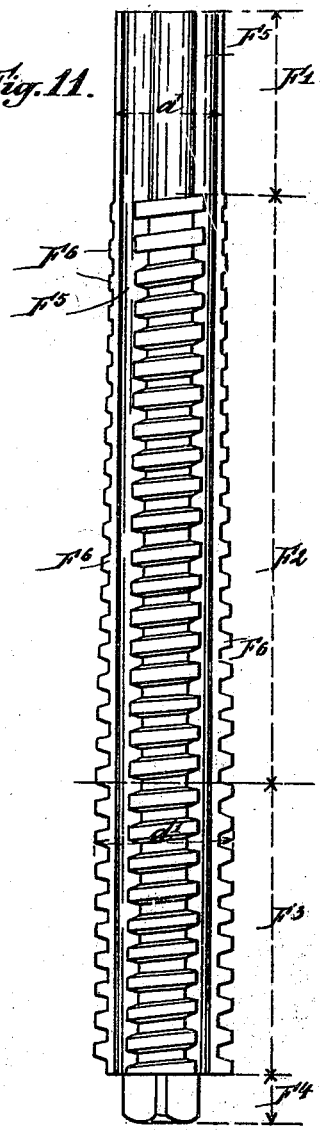
Inventor,
Victor Joseph Verheyen
by Stockbridge & Borst
Attys.

Patented May 27, 1924.

1,495,622

UNITED STATES PATENT OFFICE.

VICTOR JOSEPH VERHEYEN, OF BRUSSELS, BELGIUM, ASSIGNOR TO SOCIÉTÉ ANONYME LE PROGRÈS INDUSTRIEL, OF LOTH, NEAR BRUSSELS, BELGIUM.

SCREW-CUTTING MACHINE.

Application filed November 15, 1921. Serial No. 515,223.

*To all whom it may concern:*

Be it known that I, VICTOR JOSEPH VERHEYEN, a subject of the King of the Belgians, residing at Brussels, in the Kingdom of Belgium, have invented certain new and useful Improvements in Screw-Cutting Machines, of which the following is a specification.

This invention relates to apparatus for use in tapping screw threads in nuts or other articles which are to be provided with a female thread, and has for object an improved apparatus for tapping square, trapezoidal or other long and deep screw threads with great rapidity and without fear of breakage of the taps in any part being operated upon. In carrying out the invention I provide a machine in which the tap or screwing means is provided with longitudinal grooves and is rotated during the tapping operation by means of actuating members which engage in the said grooves at the points situated at either side of the part which is being screwed (and which will be hereinafter referred to as the work). The advance movement of the tap as the work proceeds is obtained by a feed screw actuated by the rotation of the tap itself, means being provided for the automatic disengagement of the tap from the feed screw when the operation is finished. Further, to allow the work to follow the tap to accommodate itself to any irregularities of thread of the latter during its rotation, the support for the work itself consists preferably of a carrier which may displace itself freely on an oscillating support.

Referring to the annexed drawings which show by way of example a convenient means of carrying the invention into effect:

Fig. 8 is a longitudinal section, on an enlarged scale of an oscillating support for the work carriage, showing a piece to be threaded fixed on the said carriage. Fig. 9 gives a transverse section taken on line I—I Fig. 8 showing one manner of fixing the work on the carriage.

Fig. 10 is a view similar to Fig. 9 showing the oscillating support in a second position.

Fig. 11 is a side view of the tap, similar to Fig. 7, but showing the said tap at a greater scale so as to better illustrate the several portions of the tap.

Figure 1:
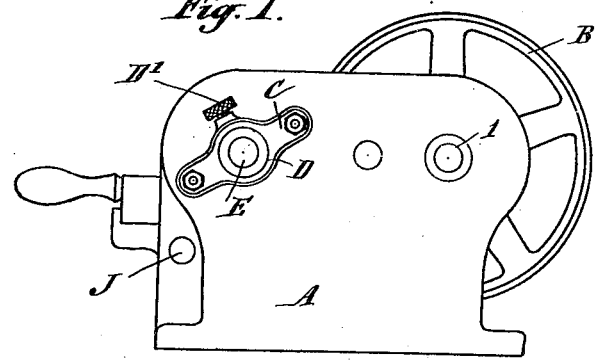
Figure 1 is a side elevation of the apparatus.
Figure 2:
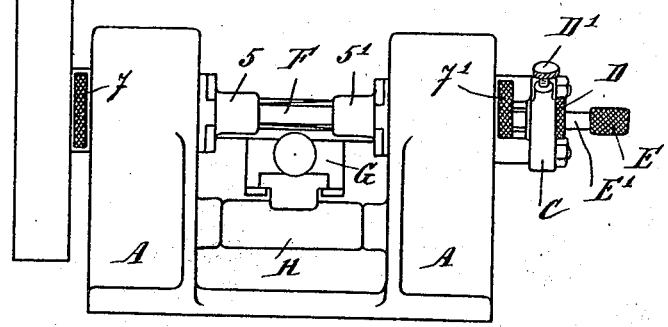
Figure 2 is a front view.
Figure 3:
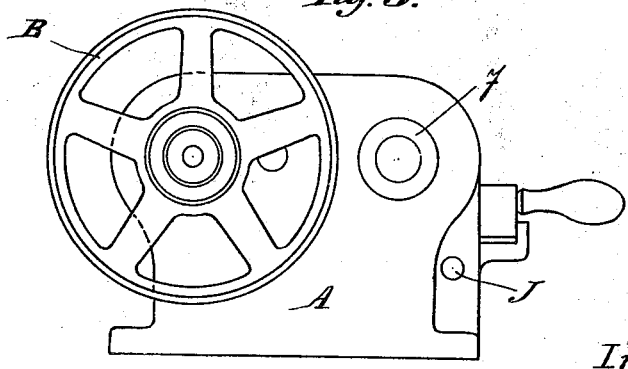
Figure 3 is a side elevation, of the driving means therefor.
Figure 4:
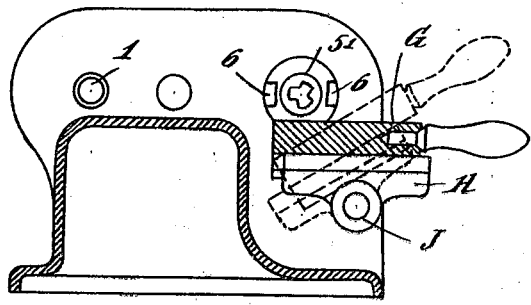
Figure 4 is a transverse vertical section on the shaft of the support for the work itself and Figure 5 is a plan, partly in section showing the driving means for the tap.
Figure 6:
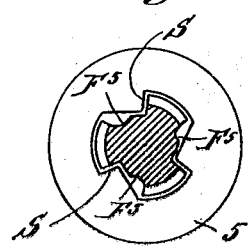
Figure 6 is a transverse section to a larger scale of the tap showing driving means, cooperating with the latter.
Figure 5:
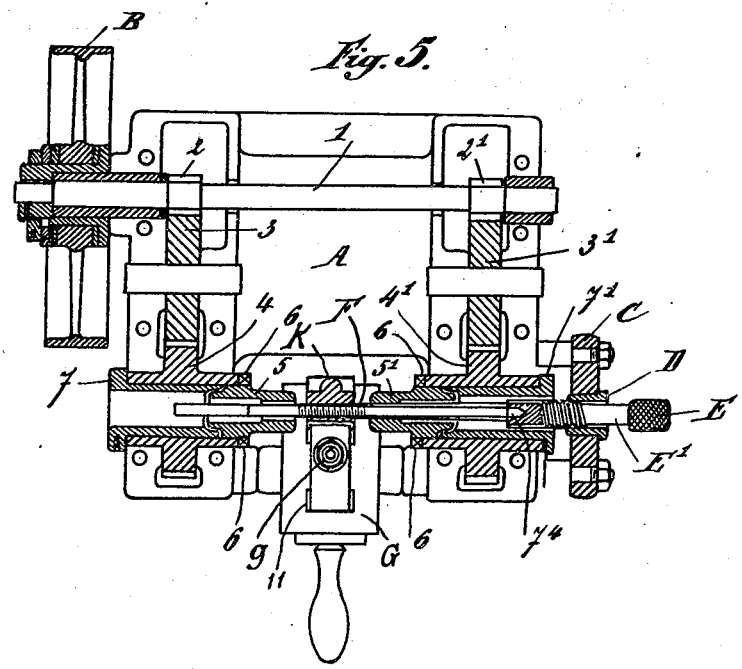

The apparatus comprises a frame A in which is mounted a shaft 1 driven by a pulley B. This shaft has mounted thereon as shown two toothed pinions 2 and $2^1$ which mesh with intermediate wheels 3 and $3^1$, the latter transmitting the movement to special toothed wheels 4 and $4^1$ mounted in the frame A. These wheels 4 and $4^1$ carry within their bosses driving members 5 and $5^1$ secured in position by means of studs 6 and the driving members are further kept in position by screwed sockets 7 and $7^1$ in the bosses of the wheels 4 and $4^1$ and are rotated by these wheels; the studs 6 ensuring a certain drive of the driving members by the wheels and determining at the same time the exact position of the said driving members in relation to the wheels 4 and $4^1$. As shown in Figure 6 these driving members are formed according to the particular form of tap employed and are provided with driving projections S which engage in the longitudinal grooves $F^5$ of the tap, as will be described later. Adjacent to the screwed socket 7' a transverse bar C is fixed to the frame of the apparatus and carries, in an axis which is a prolongation of the axis of the driving members 5—5' a removable nut D, a feed screw E being disposed within the latter as shown in Figures 2 and 5. This screw E is rotated by the rotation of the tap F by means of the squared neck $F^4$. (Figures 5 and 7.)

The work, for instance a piece K (Figs. 8 to 10) provided with a hole K' which is to be threaded, is fixed in any appropriate manner on a carriage G which is freely movable by means of slides G' on a support H which may oscillate around the fixed shaft J. In the example shown in Figs. 8 to 9 the work K is supposed to be fixed on the carriage G by means of a bolt 8 provided with a nut 9 tightening the work or piece K between the upper face of the carriage G and a plate 10 bearing on one side of the axis of the bolt 8 on the work K and on the other side of the said axis on a wedge 11 having the same thickness as the piece or work K. The manner of fixing the work on the carriage G however may be varied according to the circumstances and obviously makes no part of the invention, the only feature having some importance in this arrangement consisting in the fact that the work is supported on the carriage G which is freely movable on the oscillating support H in such a manner that the carriage can adjust itself automatically according to the dimensions of the work, and further that the piece which is to be worked may follow the irregularities in the rotation of the tap (compare for instance the positions of Figs. 9 and 10) thus avoiding all danger of breakage of the latter.

Figure 7:
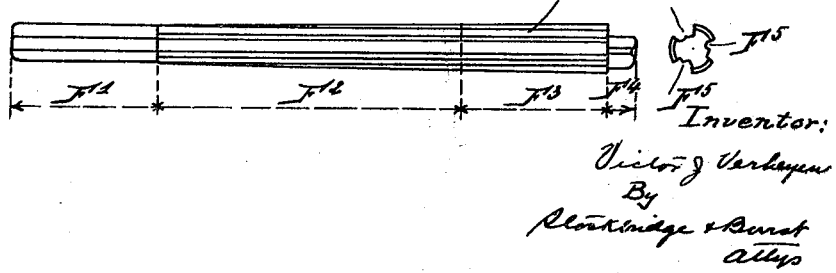
Figure 7 is a side and end elevation of the tap, of special construction, used in connection with the invention.

The apparatus above described is according to this invention employed with a special form of tap which is shown in Figure 7 and at a greater scale in Fig. 11 which illustrates more particularly the threaded or cutting portions of the tap. This tap comprises:

1. A cylindrical portion $F^1$ having a smooth outer surface this portion having a diameter $d$ (Fig. 11) and being of such a length, that the tap may be inserted within the driving members 5 and $5^1$ through the work.

2. A threaded conical portion $F^2$ of a length which is proportional to the depth of the screw threads to be cut thus allowing of the evacuation of the metal shaving cut by the tap according to the thickness of said shaving.

3. A screwed and cylindrical portion $F^3$ permitting calibration and having a diameter $d'$ (Fig. 11) corresponding exactly to the diameter of the nut taken in the bottom of grooves of the thread which is to be cut.

4. A squared neck $F^4$ to engage with the shank of the feed screw E to drive the latter by the rotation of the tap.

5. Special grooves $F^5$ formed the whole length of the tap and serving as already stated for the engagement of the driving projections S (Figure 6) of the driving members 5 and $5^1$ and also for the evacuation of shavings.

The method of operation of the apparatus is as follows: The work is fixed on the carriage G and the tap F is inserted therein, passing through the driving members 5 and $5^1$, and the feed screw E is placed in position with its nut D on the squared neck $F^4$ of the tap and in the drum C, the nut D being secured by a screw $D^1$ (Figure 2) or in any other convenient manner. The apparatus being put in motion, the tap F is rotated by the engagement therewith of the driving members 5 and $5^1$, and the tap, in turn, communicates its rotary movement to the feed screw E which by its rotation within its screwed nut D pushes the tap gradually within the part being tapped, the starting of the cutting operation of the tap being possible by the fact that the conical portion $F^2$ of the tap cuts in the work gradually increasing grooves as will be easily understood from a consideration of Fig. 11 which shows in the conical portion $F^2$ the cutting teeth F increasing gradually from the diameter $d$ of the cylindrical smooth portion of the tap to the diameter $d'$ of the part $F^3$.

The feed screw E is provided with a hollowed or flatted portion $E^1$ the length of which portion is a little greater than the length of the nut, so that when the threaded portion has traversed the whole of the nut D the feed screw E does not advance further to feed the tap F within the work. The tap F alone continues its rotation, being driven by the driving members 5 and $5^1$, and the part $F^4$ on the tap F thus disengages itself automatically from the screw E which can then be removed for readjustment of the tap when the operation is finished.

The screw E is only threaded on a part of its length, the portion E' being not threaded in order to prevent the advance of the screw as soon as the threaded portion has passed through the nut D. Consequently at the starting of the operation, the screw E, which is rotated by the tap, is caused to advance in the nut D, thus feeding the tap gradually within the material worked upon. When the threaded portion has traversed the whole of the nut D, the portion E' which is not threaded, rests within the nut D and the screw E is thus prevented from being further advanced. But at this moment, the tap, which is driven by the driving members 5 and 5' is passing through the material worked upon in such a manner that the end $F^4$ of the tap becomes disengaged from the screw E. When the work is completed the tap has passed entirely through the material and the screw E is then rotated manually in the reverse direction so as to be engaged again with the nut D and to be returned in its initial position.

It will be obvious that the details above given may be varied within considerable limits without departing from the spirit of the invention.

What I claim is:

1. In apparatus for tapping screw threads in combination a frame, a shaft adapted to rotate in said frame, driving means for said shaft, two hollow driving members arranged in alignment with each other, means for rotating said driving members by aid of the driving shaft, a work carriage arranged between said driving members, a tap provided with longitudinal grooves, driving projections formed in the hollow driving members whereby the said grooves are engaged by said projections and means whereby the tap is automatically fed.

2. In apparatus for tapping screw threads in combination a frame, a shaft adapted to rotate in said frame, driving means for said shaft, two hollow driving members arranged in alignment with each other, means for rotating said driving members by aid of the driving shaft, a work carriage arranged betwen said driving members, a tap provided with longitudinal grooves, driving projections formed in the hollow driving members, whereby the said grooves are engaged by said projections and the tap is rotated and a feed screw acting upon the tap, whereby the said tap is automatically fed by the rotation of the screw.

3. In apparatus for tapping screw threads, in combination a frame, driving means, supported by said frame, two hollow driving members arranged in alignment with each other and adapted to be rotated by said driving means, driving projections formed in said hollow driving members, a tap provided with longitudinal grooves adapted to be engaged by said driving projections, a feed screw into which one end of the tap is engaged, a screw nut within which the said feed screw is mounted and a hollowed portion forced on the feed screw whereby the feed of the screw within the nut is stopped automatically.

4. In apparatus of the kind described in combination with two hollow driving members, a tap having at one end a smooth cylindrical surface whereby the said tap is adapted to be inserted within the driving members, a conical portion of a length proportional to the depth of the thread and a cylindrical portion threaded for purpose of calibration, a feed screw arranged in alignment with the said tap and means at the end of the tap whereby said tap is adapted to be engaged with the feed screw.

5. In apparatus of the kind described, in combination a frame, driving means supported by said frame, two hollow driving members arranged in alignment with each other and adapted to be rotated by said driving means, driving projections formed in said driving members a tap provided with longitudinal grooves adapted to be engaged by said driving projections a feed screw in alignment with the tap, a screw nut within which the said feed screw is mounted, said feed screw being driven by the rotation of the tap itself and means whereby the feed screw is automatically disengaged from the tap after the screw has ceased to feed automatically.

In testimony whereof I have affixed my signature in presence of two witnesses.

VICTOR JOSEPH VERHEYEN.

Witnesses:
F. BALRAND,
EM. GEMARD.